United States Patent [19]

Fukuda

[11] 4,104,662
[45] Aug. 1, 1978

[54] FOLDING TYPE PHOTOGRAPHIC CAMERA

[75] Inventor: Susumu Fukuda, Kobe, Japan

[73] Assignee: Fuji Photo Film Co., Ltd., Minami-ashigara, Japan

[21] Appl. No.: 723,859

[22] Filed: Sep. 16, 1976

[30] Foreign Application Priority Data

Sep. 23, 1975 [JP] Japan .................................. 50-115251

[51] Int. Cl.² ............................................. G03B 17/04
[52] U.S. Cl. ...................................... 354/187; 354/288
[58] Field of Search ............... 354/787, 192, 193, 194, 354/288

[56] References Cited

U.S. PATENT DOCUMENTS

| 1,272,029 | 7/1918 | Finn .................................. 354/288 X |
| 3,630,130 | 12/1971 | Erlichman ............................ 354/288 |
| 3,677,160 | 7/1972 | Harvey ............................ 354/187 X |
| 3,693,526 | 9/1972 | Harvey ................................ 354/187 |
| 3,906,521 | 9/1975 | Ueda .................................. 354/187 X |
| 3,955,207 | 5/1976 | Ort et al. ............................. 354/194 |

FOREIGN PATENT DOCUMENTS 559,828  3/1944  United Kingdom ...................... 354/193

Primary Examiner—Edna M. O'Connor
Attorney, Agent, or Firm—Sughrue, Rothwell, Mion, Zinn and MacPeak

[57] ABSTRACT

A photographic camera of folding type including a lens and shutter assembly pivotally and oscillatingly supported through a front cover plate and folding link levers which are also pivotally conected to the camera main body, and a collapsible light shielding bellows connected between the rear portion of the lens and shutter assembly and a first housing section of the main body formed with an exposure aperture and accommodating a film container. When not in use, the lens and shutter assembly is housed in a second housing section of the main body with the forward side of the main body covered with the front cover plate, while for use, the lens and shutter assembly is brought, upon opening the front cover plate, into the photographing position, with the bellows fully expanded.

9 Claims, 6 Drawing Figures

FOLDING TYPE PHOTOGRAPHIC CAMERA

BACKGROUND OF THE INVENTION FIELD OF THE INVENTION

The present invention relates to a photographic apparatus and, more particularly to a photographic camera of folding type employing film in the form of individual units, large-sized sheets, rolls and the like which can be processed through diffusion transfer method, and having its lens and shutter assembly adapted to be housed in a camera main body when not in use.

DESCRIPTION OF THE PRIOR ART

Recently, there have conventionally been proposed various types of film units utilizing known diffusion transfer method, particularly those in which the photosensitive layer and transfer image layer are combined into a unit to form a single sheet, some types of which film units are commercially available at present.

As is well known in the art, in the film units of the above described types, substance constituting negative or latent image formed on the photosensitive layer is directly transferred onto the transfer image layer and fixed thereat through a diffusion transfer process in which processing solution extruded from breakable pods is spread through the film unit under the action of pressure means. In such an arrangement, however, it is inevitably necessary to increase the size of image plane, which consequently requires employment of a lens having a long focal point, thus the size of camera itself being unavoidably increased.

In order to solve the problems as described above, there have also been proposed conventionally several kinds of cameras of folding or collapsible types in which a bellows is employed for allowing the lens supporting means or lens and shutter assembly to be housed in the camera main body when not in use, and to be drawn out therefrom only during use of the camera. In the above described prior art cameras, especially those of erect image forming type, however, there are none that will fully satisfy the requirements in construction for accommodating the lens and shutter assembly in the camera main body.

Accordingly, an essential object of the present invention is to provide a camera of folding type in which lens and shutter assembly can be completely accommodated in a housing of a camera main body when not in use, while the same assembly can be correctly positioned in front of an exposure aperture formed in the camera main body during use by simple operation.

Another important object of the present invention is to provide a camera of the above described type in which the lens and shutter assembly is pivotally supported to extend from the camera main body for rotating said assembly to a position deviated from the exposure aperture of the camera when not in use so as to present a compact camera of flat box-like configuration.

A further object of the present invention is to provide a camera of the above described type in which the lens and shutter assembly can be accommodated in the housing in a direction perpendicular to the front surface of the camera main body, without particularly requiring any lens cap to be applied to the lens.

A still further object of the present invention is to provide a camera of the above described type in which the lens and shutter assembly can be shifted to the accommodated position semi-automatically through simple operation.

Another object of the present invention is to provide a camera of the above described type which is accurate in functioning and simple in construction, and can be manufactured at low cost.

SUMMARY OF THE INVENTION

According to a preferred embodiment of the present invention, the camera of folding type includes a lens supporting means or lens and shutter assembly having an objective lens incorporated therein and pivotally and oscillatingly supported through a front cover plate and folding link levers, while a collapsible light-shielding bellows is connected between the rear portion of the lens and shutter assembly and an exposure aperture of a first housing section in which a film container is housed. The lens and shutter assembly is housed when not in use in a second housing section formed in a camera main body, while the forward wall of the camera main body is covered with the front cover plate. For use, the lens and shutter assembly is brought in front of the camera forward wall and supported thereat when the cover plate is opened, with the bellows fully expanded, by which arrangement, since the lens and shutter assembly is completely housed in the camera main body which is closed by the front cover plate, no separate lens cap is particularly required, and thus a camera compact in size and readily transported is advantageously presented, with substantial elimination of disadvantages inherent in the conventional folding type cameras of like kind.

Furthermore, according to the present invention, since the lens and shutter assembly can readily be displaced by simple operation of the folding link levers to which a spring member capable of reversing the urging force thereof is connected, the withdrawal of the lens and shutter assembly to the photographing position and also the accommodation of the same assembly into the housing section can be effected semi-automatically, thus a camera having improved operability being offered.

These and other objects of features of the present invention will become apparent from the following description taken in conjunction with the preferred embodiment thereof with reference to the attached drawings in which;

FIG. 1 is a perspective view of a photographic camera of folding type according to one embodiment of the invention, with its front cover plate closed, FIG. 2 is a similar view to FIG. 1, but particularly shows a state where its front cover plate is opened to bring a lens and shutter assembly into photographying position, FIG. 3 is a schematic top plan view of the photographic camera of FIG. 2, FIG. 4 is a side elevational view, partly in section, of the photographic camera of FIG. 2, FIG. 5 is a development of a collapsible bellows employed in the photographic camera of FIG. 2, and FIG. 6 is a similar view to FIG. 4, but paticularly shows the collapsible bellows in expanded and folded states with other components of the camera removed for clarity.

Before the description of the present invention proceeds, it is to be noted that like parts are designated by like reference numerals throughout several views of the accompanying drawings.

DESCRIPTION OF PREFERRED EMBODIMENTS

Figure 1:
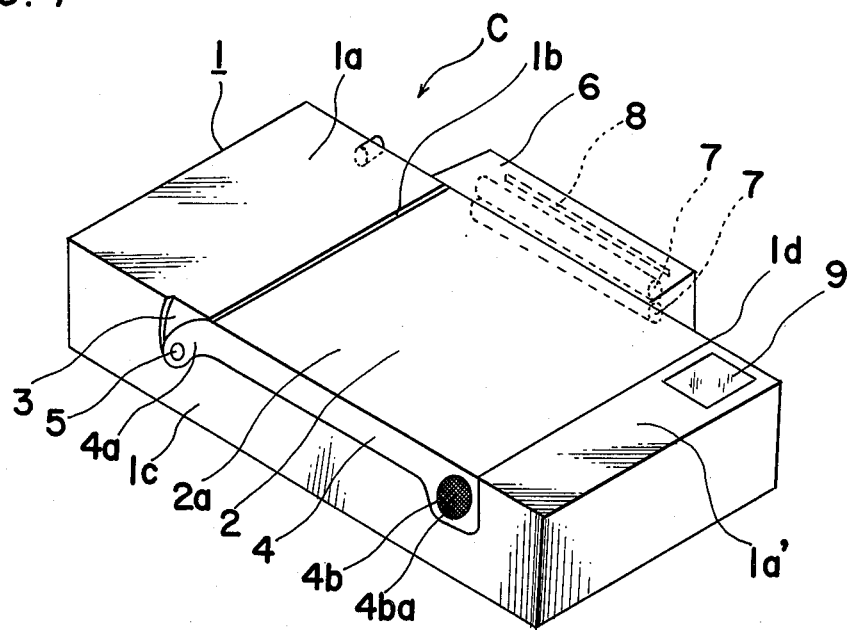

Referring now to FIGS. 1 to 6, there is shown in FIG. 1 a camera C of folding type of the invention which is in its folded state. The camera C includes a comparatively flat camera main body 1 of rectangular box like configuration having, in its forward wall 1a, an approximately square cut-out portion 1b, and a front cover plate 2 with its front surface 2a corresponding in the configuration with the cut-out portion 1b and fitting into said cut-out portion 1b in the folded state as shown, with the surface 2a of said cover plate 2 being flush with the surface of the forward wall 1a of the camera main body 1 for protecting the interior of said main body 1. The front cover plate 2 is further provided at opposite side edges thereof with bent portions or ribs 4 which extend downwardly at right angles from said surface 2a and fit into corresponding elongated stepped portions or grooves 3 formed in longitudinal side walls 1c and 1d of the main body 1 as shown. The cover plate 2 is pivotally connected, at the ends 4a of the ribs 4 thereof, to the side walls 1c and 1d by pins 5 secured to said side walls 1c and 1d, while the other ends 4b of the ribs 4 are provided, for example, with knurled portions 4ba to facilitate holding the cover plate 2 between fingers thereat for selective opening and closing of the same cover plate 2. The camera main body 1 is further provided with an approximately rectangular roller housing 6 longitudinally formed at the side wall 1d thereof, in which roller housing 6, a pair of film unit processing rolls 7 are rotatably housed as shown in dotted lines, while a slit-like outlet 8 for the film unit (not shown) is formed in the outer side wall of the roller housing 6 in a direction parallel to the processing rolls 7. In the portion 1a' of the forward wall 1a defined by one edge of the cut-out portion 1b remote from the pivotal portion of the cover plate 2 and a corresponding edge of the main body 1, a view finder 9 is provided adjacent to its one corner.

Figure 2:
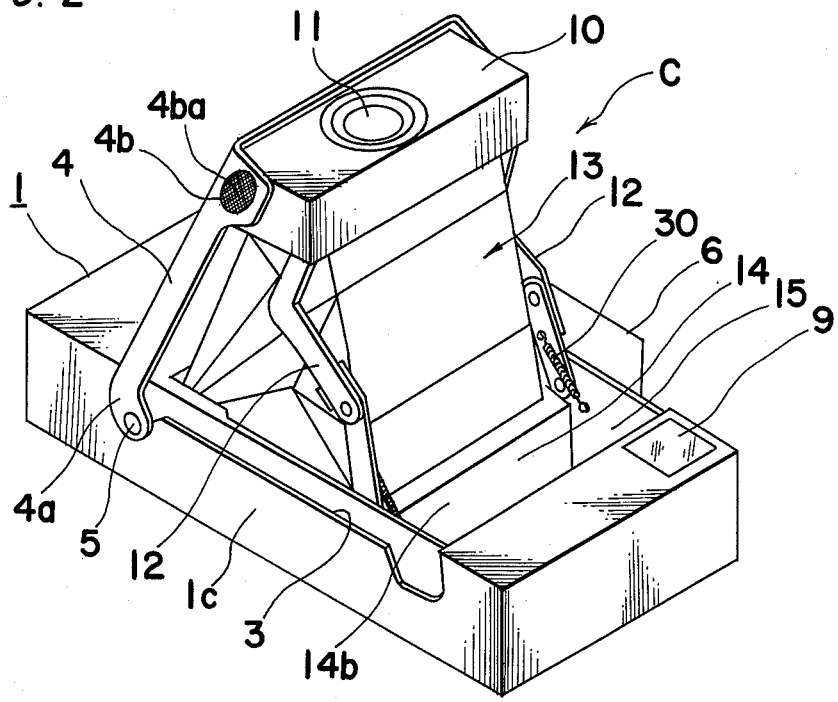

In FIG. 2 showing the camera C of FIG. 1 with its cover plate 2 opened, a lens supporting means or lens and shutter assembly 10 of comparatively flat rectangular boxlike configuration having an objective lens or picture taking lens 11 at its central portion, and shutter and aperture diaphragm assembly incorporated therein is pivotally and oscillatingly supported at the ends 4b of the ribs 4 of the front cover plate 2 in a manner to be described later and is connected to the main body 1 by a pair of folding link levers 12 for selectively movement between the shooting position of FIG. 2 and the accommodated position in FIG. 1 The rear portion of the lens and shutter assembly 10 is connected by a light shielding collapsible bellows indicated generally at 13 to a front portion of a first housing section 14 formed at the central portion of the main body 1 for accommodating a film container (not shown) therein. The collapsible bellows 13 is held in an expanded state when the assembly 10 is supported at the front of the forward wall 1a of the main body 1 in parallel to said wall 1a with the optical axis of the lens 11 being directed normal to the wall 1a for shooting, and can be folded into an approximately flat state, following the movement of the lens and shutter assembly 10, as the assembly 10 and consequently the front cover plate 2 are rotated clockwise about the pins 5 for housing assembly 10 in a second housing section 15 provided in the main body 1 adjacent to the first housing section 14.

Figure 3:
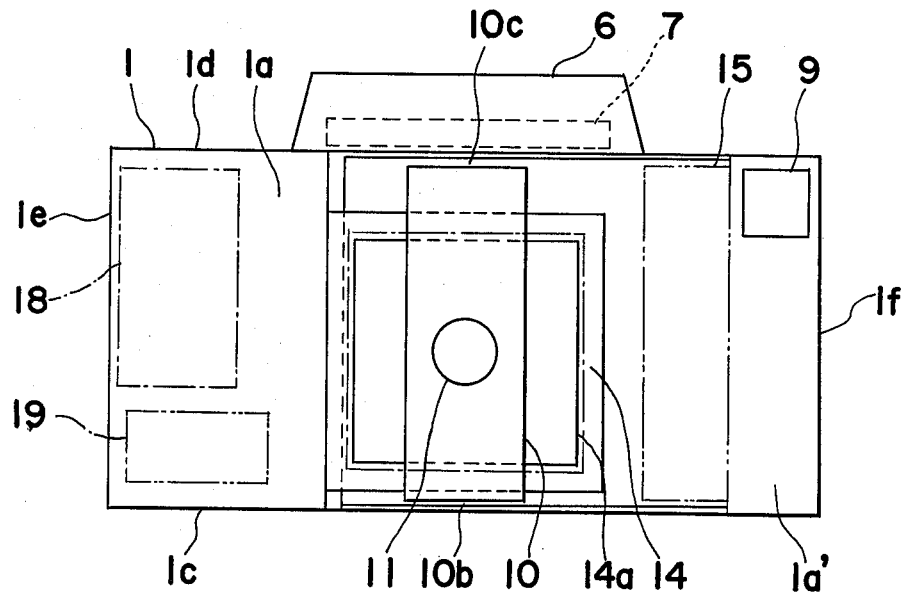
Figure 4:
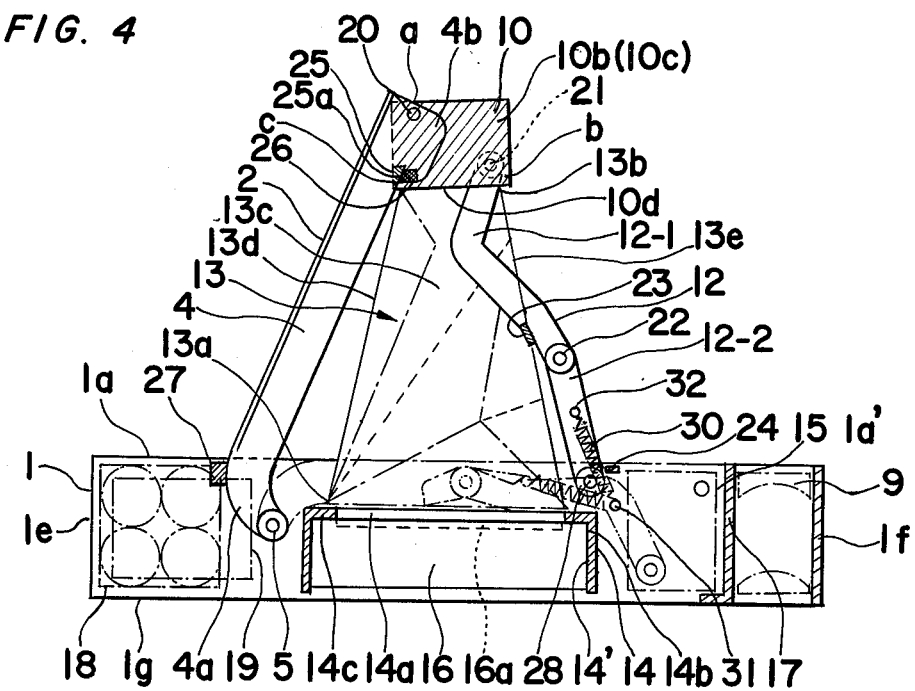

Referring particularly to FIGS. 3 and 4, more specifically, the first housing section 14 defines a chamber 14' formed on the central portion of the rear wall of the main body 1 for positioning and housing the film container 16 therein, and includes an exposure aperture 14a formed in a forward wall 14c thereof which is lower in its position than the forward wall 1a of the main body 1, FIG. 4, to provide a space for accommodating the bellows 13 in the contracted state therebetween, while an exposure opening 16a of the film container 16 coincides with the aperture 14a of the housing 14. The second housing section 15 lies between the right-hand side wall 14b of the first housing 14 and the wall 17 which extends downwardly at right angles from the edge of the forward wall 1a' so as to accommodate therein the lens and shutter assembly 10 as it moves in a direction normal to the forward wall 1a', while lens and shutter assembly for the view finder 9 is housed between the wall 17 and a corresponding side wall 1f of the main body 1. On the other hand, in a space defined by the forward wall 1a, rear wall 1g and side walls 1c, 1d and 1e of the main body 1 at the side thereof remote from the view finder 9, a battery chamber 18 for accomodating therein cells as a power source for diving mechanism (not shown) is provided, with an electric motor 19 as a driving source being disposed adjacent to the battery chamber 18. In FIG. 4, the lens and shutter assembly 10 is pivotally connected at right upper corners a of opposite side walls 10b and 10c thereof to the ends 4b of the ribs 4 of the front cover plate 2 by pin 20, while the right lower corners b of the same side walls 10b and 10c diagonally facing the corners a thereof are also pivotally connected to the extreme ends of the folding link levers 12 by pins 21, thus the front cover plate 2, the side walls 10b and 10c of the lens and shutter assembly 10 and the pair of folding link levers 12 forming a kind of link mechanism. In this link mechanism, each of the pair 12 of folding link levers includes an approximately L-shaped lever 12-1 and a straight lever 12-2 which are pivotally connected to each other at corresponding ends by a pin 22. The lever 12-2 has, at its end adjacent to the corresponding end of the lever 12-1, a bent portion or stopper 23 for restricting further rotation of the lever 12-1 thereat, while another stopper 24 is disposed adjacent to and at the right of the other end of the lever 12-2 pivotally connected to the main body 1 by a pin 28 also for restricting further clockwise rotation of the lever 12-2 thereat. Accordingly, when the levers 12-1 and 12-2 are raised to such positions that they contact the stopper 23 and 24 to limit further clockwise rotation, the lens and shutter assembly 10 is correctly held at a position ready to shoot. It should be noted here that the stoppers 23 and 24 should be disposed in such positions that, at the position where the levers 12 are fully raised or extended, the pin 22 connecting the levers 12-1 and 12-2 is in a position slightly deviated outside from a line connecting the pin 21 for the lens and shutter assembly 10 and the pin 28 for the main body 1 for preventing the levers 12 from being folded unnecessarily.

For rigidly supporting the lens and shutter assembly 10 at the photographing or shooting positions as described above, there is provided a triangular stopper 25 at a left lower corner c (FIG. 4) of the side wall 10b of the lens and shutter assembly 10, while another stopper 26 is provided on the corresponding inner surface of the rib end 4b of the front cover plate 2 for linearly contacting an oblique side 25a of the triangular stopper 25 from righthand side in FIG. 4, so that the three corners a, b and c of the side wall 10b are positioned as triangle-forming points by the pins 20 and 21 and the stoppers 25 and 26, with an angle of the triangle being angularly fixed by the stoppers 25 and 26. Adjacent to a left-hand edge of the rib 4 of the front cover plate 2 immediately above the pivoted end 4a thereof, there is disposed another stopper 27 on the main body 1 for restricting further counterclockwise rotation of the cover plate 2 thereat. Needless to say, such a stopper 27 may be replaced by one edge of the elongated groove 3 shown in FIG. 2 if suitably modified to suit to the purpose as a stopper.

Still referring to FIG. 4, when the link lever pairs 12 are to be folded as shown in chain lines, FIG. 1, with the connections 22 thereof being depressed leftward, the straight levers 12-2 rotate counterclockwise about the pins 28 secured to the main body 1, while the L-shaped levers 12-1 rotate clockwise about the pins 22, and consequently, the lens and shutter assembly 10 follows in its movement with the rotation of the levers 12-1 through the pins 21, while the front cover plate 2 follows in its movement with the lens and shutter assembly 10 through the pin 20, so that the front cover plate 2 rotates clockwise about the pin 5, with the assembly 10 rotating clockwise about the pin 20 to a larger degree than that of the front cover plate 2 to contact the inner surface of the front cover plate 2, and as the same front cover plate 2 further rotates, the assembly 10 is rotated up to the accommodated position shown in chain lines in FIG. 4, when the front cover plate 2 is lowered to such a position that the surface 2a thereof is flush with the forward wall 1a of the main body 1, the assembly 10 is completely housed within the second housing section 15 mentioned earlier.

As shown in FIG. 4, it is preferable to connect at least one spring member 30 between a pin 31 secured to the main body 1 and another pin 32 fixed to the surface of the straight lever 12-2 in such a manner that the direction of the urging force of the spring 30 is reversed during rotation of the lever 12-2, so that during opening of the front cover plate 2, the pair 12 of link levers 12-1 and 12-2 are urged to be extended until the same levers 12-1 and 12-2 respectively contact the stoppers 23 and 24, and during closing of the cover plate 2, i.e., folding of the link levers 12-1 and 12-2, the link levers 12-1 and 12-2 are urged to be folded by the spring members 30 for semiautomatically effecting the opening and closing of the front cover plate 2 and consequently facilitating the withdrawal of the lens and shutter assembly 10 into the photographing position and the accommodation of the same assembly 10 into the housing position in the main body 1 so as to achieve stable and efficient operation.

Collapsible bellows 13 selectively brought into the expanded state and contracted or folded state, following the movement of the lens and shutter assembly 10, is of square tube-like configuration (when expanded) and is fixed at its base edges 13a thereof around the exposure aperture 14a of the first housing section 14, while the forward edges 13b of said bellows 13 are secured to the rear surface 10d of the lens and shutter assembly 10. Fundamentally, the bellows 13 moves or "rotates" clockwise following the clockwise rotation of the lens and shutter assembly 10 to be gradually folded into the contracted state, and is finally folded to approximately flat state to be accommodated in the space between the forward wall 14c of the first housing section 14 and the inner surface of the cover plate 2, in which folded state of the bellows 13, the lens and shutter assembly 10 is in a state free to pivot about the pins 21.

Figure 5:
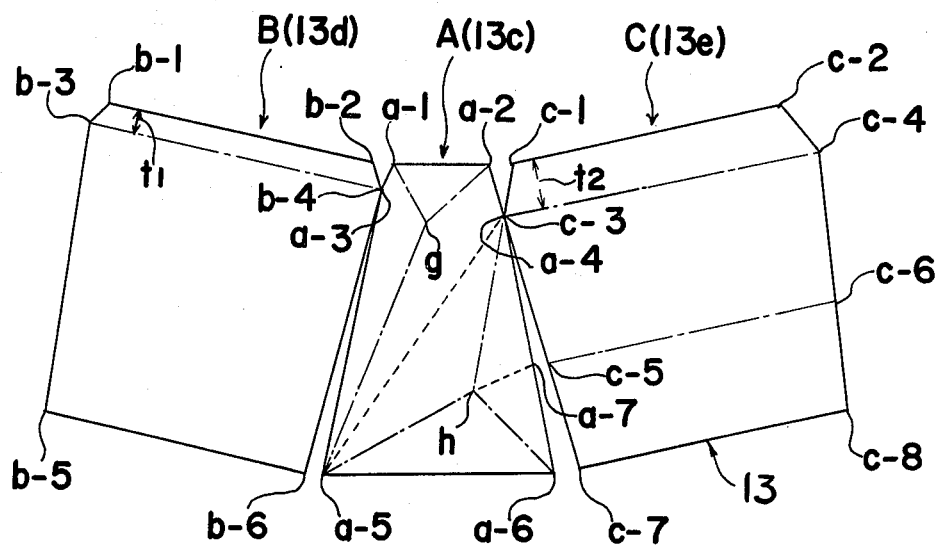

Referring to FIG. 5 showing a development of the bellows 13 having preferable folds or pleats, a surface A of approximately trapezoidal form at the center corresponds to the side wall 13c of the bellows 13 (FIG. 4) located at the same side as the side walls 10b and 10c of the lens and assembly 10, while a surface B at the left-hand side of FIG. 5 corresponds to a large side wall 13d facing the inner surface of the cover plate 2, with a surface C at the right-hand side corresponding to another large side wall 13e which faces the side wall 13d. It is to be noted that in each of the surfaces A, B and C, dotted lines indicate "convex" folding lines whereat the corresponding side wall of the bellows 13 projects outwardly with respect to the surface defined by the dotted lines when the bellows 13 is folded, while chain lines represent "concave" folding lines whereat the corresponding side walls of the bellows 13 project inwardly with respect to the surface defined by the chain lines.

The surface B has the "concave" folding line $b$-3 to $b$-4 parallel to and spaced from its forward edge $b$-1 to $b$-2 by a small distance $t1$, which folding line $b$-3 to $b$-4 is slightly longer than the forward edge $b$-1 to $b$-2 parallel to and equal in its length to a rear or base edge $b$-5 to $b$-6. On the other hand, the surface C has the "concave" folding lines $c$-3 to $c$-4 parallel to and spaced from its forward edge $c$-1 to $c$-2 by a distance $t2$ which is larger than the distance $t1$ of the folding line $b$-3 to $b$-4 of the surface B. The folding line $c$-3 to $c$-4 is also slightly longer than the forward edge $c$-1 to $c$-2 and a rear edge $c$-7 to $c$-8 which is parallel to said edge $c$-1 to $c$-2. These two "concave" folding lines $b$-3 to $b$-4 and $c$-3 to $c$-4 facilitate the pivotal movement of the lens and shutter assembly 10, while triangles formed by the points $b$-1, $b$-3 and $b$-5, and $b$-2, $b$-4 and $b$-6 in the surface B, and triangles formed by the points $c$-1, $c$-3 and $c$-7, and $c$-2, $c$-4 and $c$-8 in the surface C provide the bellows 13 with room to prevent excessive extension thereof.

Meanwhile, the surface A corresponding to the side wall 13c of the bellows 13 has a "convex" folding line $a$-5 to $a$-4 extending from the point $a$-5 at one corner of its base portion to the point $c$-3 of the "concave" folding line $c$-3 to $c$-4 in the surface C, while a surface $a$-1, $a$-3, $a$-5, $a$-4 and $a$-2 divided by a "convex" folding line $a$-5 to $a$-4 and including the forward edge $a$-1 to $a$-2 therein is folded in a flat state in such a manner that three "concave" folding lines $a$-1 to $g$, $a$-5 to $g$ and $a$-2 to $g$ meeting at a point $g$ approximately equal to an intersection of bisectors of an angle $a$-2, $a$-1 and $a$-3 and an angle $a$-3, $a$-5 and $a$-4 respectively are folded between a side edge $a$-1, $a$-3 and $a$-5 and the "convex" folding line $a$-4 and $a$-5. On the other hand, a triangular surface $a$-4, $a$-5 and $a$-6 including the base edge $a$-5 to $a$-6 is folded at three "concave" folding lines $a$-4 to $h$, $a$-5 to $h$ and $a$-6 to $h$ formed by bisectors of each of the vertical angles which meet at the point $h$. Another "convex" folding line $a$-7 to $h$ extending from the point $h$ to a point $a$-7 which corresponds in position to a point $c$-5 of a second "concave" folding line $c$-5 to $c$-6 formed in approximately the central portion of the surface C makes it possible for a triangle $a$-4, $h$ and $a$-7, and a triangle $a$-7, $h$ and $a$-6 to be folded in directions opposite to each other with the "convex" folding line $a$-7 to $h$ as a boundary line.

Since function and structure of another side wall confronting the surface A are exactly the same as those of the surface A, detailed description thereof is abbreviated for brevity.

Figure 6:
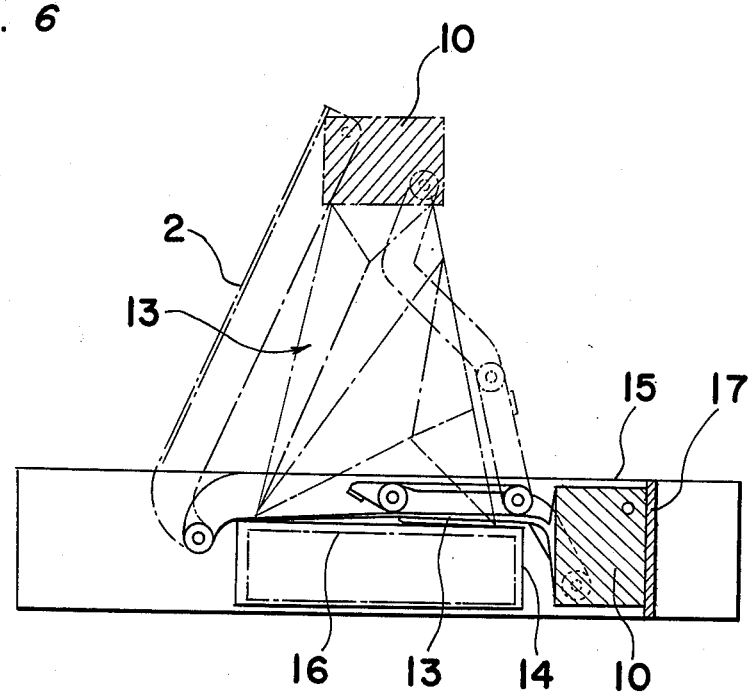

Referring to FIG. 6, according to the bellows 13 having structure as described above, when the lens and shutter assembly 10 is to be housed into the second housing section 15, the bellows 13 in its expanded state can be positively folded in the flat state onto the first housing section 14, thus allowing the assembly 10 to be housed in the second housing section 15 in a state rotated through 90° from the photographing position. As described earlier, since the amount $t2$ of folding at the "concave" folding line $c$-3 to $c$-4 in the surface C ($13e$) confronting the surface B ($13d$) is adapted to be larger than the amount $t1$ of folding at the "concave" folding line $b$-3 of surface B to $b$-4 facing the front cover plate 2, the lens and shutter assembly 10 can be housed into the housing section 15 more deeply by the depth equivalent to the height of the first housing section 14 than otherwise, and therefore, the front cover plate 2 is not obstructed by the height of the assembly 10 from being flush with the forward wall $1a$ of the camera body 1 when fully closed.

It should be noted here that the folds or pleats formed in the bellows 13 are not limited to those described as effected in the foregoing embodiment, but may be modified to any other form within the scope of the invention.

As is seen from the foregoing description, by pivotally and oscillatingly supporting the lens and shutter assembly 10 through the front cover plate 2 and the folding link lever pairs 12, with the light-shielding bellows 13 being provided to be selectively brought to the expanded state and the folded state, following the movement of the assembly 10, the forward wall $1a$ of the camera main body 1 is perfectly covered by the front cover plate 2 with the lens and shutter assembly 10 being completely accommodated in the second housing section 15 as shown in FIG. 1 when not in use, while upon opening of the front cover plate 2 by holding the holding portions $4ba$ provided on the same cover plate 2, the assembly 10 is correctly brought into the photographing position in front of the camera main body 1 so that the optical axis of the lens 11, thus supported, is perpendicular to the center of the exposure aperture $14a$ of the first housing section 14 as shown in FIG. 2. In the above case, the spring member 30 connected to the link lever pairs 12 in the earlier described manner exerts force in such a manner as to raise or extend the link lever pairs 12 in the course of opening of the front cover 2, and therefore the lens and shutter assembly 10 is semi-automatically rotated to the photographing position and is supported thereat, while the assembly 10 is positively positioned and held at the photographing position so as not to be unnecessarily displaced by the engagement of the stopper 25 at the side of the assembly 10 with the stopper 26 at the side of the front cover plate 2.

On the other hand, for accommodating the lens and shutter assembly 10 into the second housing section 15 from the photographing position, the pair 12 of link levers are folded to reverse the urging force of the spring member 30, thereby to urge the same pairs 12 of link levers in a direction for further folding thereof, and thereafter, the front cover plate 2 is semi-automatically brought to the fully closed position shown in FIG. 1

It should be noted here that in the foregoing description, the present invention is mainly described with reference to the so-called "auto-process" camera, but the concept of the invention is not limited in its application to such "auto-process" camera, and is also readily applicable to any other cameras of folding type particularly those employing large-sized film in the forms of sheets or rolls.

As is clear from the foregoing description, according to the folding type photographing camera of the invention, the lens and shutter assembly having the objective lens incorporated therein is pivotally and oscillatingly supported through the front cover plate and folding link levers, with the collapsible light shielding bellows of square tubelike configuration being connected between the rear surface of the lens and shutter assembly and the exposure aperture of the first housing section in which the film container is housed. When not in use, the lens and shutter assembly is housed in the second housing section formed in the camera main body, with the forward side of the camera main body being covered with the front cover plate, while for use, the lens and shutter assembly is brought, upon opening of the cover plate, in front of the camera forward surface and supported thereat, with the bellows fully expanded. Therefore, according to the present invention, since the lens and shutter assembly is completely housed in the camera main body which is closed by the front cover plate, no separate lens cap is particularly required, thus a camera compact in size and easy to carry about is advantageously presented. Furthermore, the arrangement for pivotally and oscillatingly supporting the lens and shutter assembly is effective for substantially increasing the rocking radius of the lens and shutter assembly as the same assembly approaches the photographing position so as to make it possible to provide a large relative distance with respect to the exposure aperture. Meanwhile, for the accommodation of the lens and shutter assembly into the camera main body, the space for housing the same assembly can be formed in the position adjacent to the side of the first housing section, so that the entire camera main body can actually be made compact.

Moreover, according to the present invention, the lens and shutter assembly can readily be retracted by simple operation of the folding link levers, and when the spring member for reversing purpose is connected to the link lever, the drawing out of the lens and shutter assembly to the photographing position and also the accommodation of the same assembly into the housing section can be effected semiautomatically, thus resulting in marked improvements of camera operability, and stabilization in supporting the lens and shutter assembly at the photographing position.

Although the present invention has been fully described by way of example with reference to the attached drawings, it is to be noted that various changes and modifications are apparent to those skilled in the art. Therefore, unless otherwise, such changes and modifications depart from the scope of the present invention, they should be construed as included therein.

What is claimed is:

1. A photographic camera of folding type which comprises a main body of rectangular box-like configuration having a first housing section which is formed with an exposure aperture in a forward wall thereof facing a forward side of said main body in terms of the object being photographed so as to accommodate therein a film container in such a manner that an exposure opening of the film container coincides with said exposure aperture of said first housing section and a second housing section being formed in a position adjacent to said first housing section and between said forward side and a rear side of said main body, lens supporting means having exposure means incorporated therein, a cover plate member pivotally connected, at one end thereof, to said main body in a position corresponding to said second housing section, with said exposure opening of said first housing section being located therebetween, for rotation between a first position to cover said forward side of said main body and a second position whereat said lens supporting means is held in photographing position, with the other end of said cover plate member pivotally connected to an adjacent corner portion of the side wall of said lens supporting means for covering, at said first position, said forward side of said main body into which said lens supporting means is housed, a pair of folding link levers, each pair having first and second lever members pivotally connected at their ends to each other for being folded in one direction, with one end of the first lever member of each of said pairs being pivotally connected to said main body and one end of the second lever member of each of said pairs being pivotally connected to the corner portion diametrically opposite to said adjacent corner portion of the side wall of said lens supporting means, for pivotally supporting said lens supporting means together with said cover plate member, during rotation thereof, between said first and second positions, and a tension spring for said first lever member, said tension spring being connected at one end to said main body and at the other end to said first lever member intermediate of its ends so as to bias said first lever member into its two extreme positions and to resist movement between those positions such that said lens supporting means automatically moves during rotation of said cover plate member towards a first position from said second position and vice versa after being partially rotated out of one position and towards another, and a collapsible light-shielding bellows having one peripheral edge secured around said exposure aperture of said first housing section, and the other peripheral edge thereof around the rear face of said lens supporting means with said bellows being expanded at said second position and folded into a flat state at said first position.

2. A photographic camera as claimed in claim 1, wherein said forward wall of said first housing section formed with said exposure aperture therein is lower than said forward side of said main body to provide a space therebetween to hold said bellows in the folded state when said cover plate member is in said first position, said front cover plate member includes opposite side edges which fit within said space when said cover plate member is in said first position, said first lever member is straight and said second lever member is L-shaped and is elongated with respect to said first lever member such that said first lever member occupies a portion of said space adjacent the sides of said cover plate member and a portion of said second lever member extends beyond said space to dispose said lens supporting means in said second housing section when said cover plate member is in said first position.

3. A photographic camera as claimed in claim 1, wherein said lens support means is a lens and shutter assembly of rectangular box-like configuration having a lens comprising said lens means at the central portion thereof and a shutter and aperture diaphragm incorporated therein forming said exposure means.

4. A photographic camera as claimed in claim 1, wherein said lens and shutter assembly is housed, at said first-position of said cover plate member, in said second housing section, with the front face of said lens and shutter assembly being perpendicular to said forward side of said main body.

5. A photographic camera as claimed in claim 1, wherein said lens and shutter assembly is held, at said second position of said cover plate member, in position where the optical axis of said lens is perpendicular to the center of said exposure aperture of said first housing section.

6. A photographic camera as claimed in claim 1, wherein said cover plate member is a square plate fitting into a corresponding cut out portion in said forward side of said main body, said cover plate member having ribs integrally formed at opposite side edges thereof, said ribs being received in corresponding grooves longitudinally formed at opposite side walls of said main body, each of said ribs being connected at one end thereof to said main body to constitute said pivotal connection at said one end of said cover plate member and at the other end thereof to said adjacent one corner portion of the side wall of said lens supporting means to constitute said pivotal connection at said the other end of said cover plate member.

7. A photographic camera as claimed in claim 6, wherein said cover plate member is engageable with a stopper member formed on said main body for being restricted against further rotation beyond said second position.

8. A photographic camera as claimed in claim 1, wherein said pair of folding link levers are provided with stopper members for restricting their further folding beyond said second position under the bias of said tension spring and for holding said lens supporting means exactly at said photographing position.

9. A photographic camera as claimed in claim 1, wherein said collapsible light shielding bellows is provided with folds formed therein in such a manner as to permit said bellows to be folded in approximately flat state, into said space between said forward side of said main body and said forward wall of said first housing section having said exposure aperture when said cover plate member is in said first position, with said lens supporting means being free to pivot during rotation of said cover plate member to said first position.

* * * * *